United States Patent [19]
Peacock

[11] Patent Number: 5,231,866
[45] Date of Patent: Aug. 3, 1993

[54] ACOUSTIC LEAK DETECTION SYSTEM

[75] Inventor: Martin J. Peacock, Katy, Tex.

[73] Assignee: DNV Industrial Services, Inc., Houston, Tex.

[21] Appl. No.: 705,736

[22] Filed: May 28, 1991

[51] Int. Cl.5 ............................................. G01M 3/24
[52] U.S. Cl. .................... 73/40.5 A; 73/592
[58] Field of Search .......................... 73/40.5 A, 592

[56] References Cited

U.S. PATENT DOCUMENTS

| | | |
|---|---|---|
| 3,264,864 | 8/1966 | Reid et al. |
| 3,838,593 | 10/1974 | Thompson ........................ 73/40.5 A |
| 3,930,556 | 1/1976 | Kusunda et al. |
| 4,640,121 | 2/1987 | Leuker et al. ..................... 73/40.5 A |
| 4,697,456 | 10/1987 | Maser ...................................... 73/592 |
| 4,823,600 | 4/1989 | Biegel et al. ........................... 73/592 |
| 4,848,462 | 8/1989 | Coulter et al. .................. 73/40.5 A |
| 5,052,215 | 10/1991 | Lewis ............................... 73/40.5 A |

FOREIGN PATENT DOCUMENTS

| | | | |
|---|---|---|---|
| 3726585 | 2/1989 | Fed. Rep. of Germany ... | 73/40.5 A |
| 42946 | 3/1983 | Japan ................................. | 73/40.5 A |
| 208636 | 12/1983 | Japan ................................. | 73/40.5 A |
| 223628 | 10/1986 | Japan ................................. | 73/40.5 A |

*Primary Examiner*—Hezron E. Williams
*Assistant Examiner*—Joseph W. Roskos
*Attorney, Agent, or Firm*—Gunn & Kuffner

[57] ABSTRACT

An acoustic leak detection system comprises a sensor array, data acquisition unit, and computer analysis of detected leak signals. Sensors are arranged in a small array about the base of the storage tank and provide signals to the data acquisition module which are digitized and analyzed to compute spherical coordinates of detected signals for all permutations of sensor positions and signal arrival times for forming a vector indicative of the signal path.

6 Claims, 1 Drawing Sheet

ACOUSTIC LEAK DETECTION SYSTEM

BACKGROUND

The present invention relates to leak testing of storage tanks, particularly, an acoustic leak detection system using a small array of sensors for detecting leaks in storage tanks.

Leak testing of new storage tanks is now a routine matter. However, it is estimated that there are as many as 700,000 above ground storage tanks in the United States today. Their capacity ranges from 500 barrels to 500,000 barrels with the contents covering a wide range of petroleum products and chemicals. Operators and owners of large oil and chemical storage tanks require a sensitive test that may be applied routinely with minimal disruption to tank operations to locate storage tank leaks. The primary concern is with the environmental impact of a leak rather than a loss of product. Public concern, and pending regulations and the rising cost of clean up after a spill are focusing attention on leak testing. Regardless of the size of a tank, the potential for adverse environmental impact from storage tank leaks is greater than that from a tank or a pipeline failure. In case of a major spill, there is an immediate reaction and the bulk of the contaminants are cleaned up relatively quickly. A small leak is insidious. For example, in 5 years a 1/16 inch hole in a storage tank could leak half a million gallons or more of product, causing extensive contamination. Thus, the potential impact of this relatively small, if hard to find leak, is enormous.

Several methods for leak detection are known in the prior art. For example, soil testing monitors the external environment for the presence of leaked product. While this approach can detect very low levels of a specific substance, it cannot determine how or when the leak occurred. Also surface spills or other non-leak related releases may be mistaken as a leak.

Precision volumetric testing is effective on underground tanks, but its utilization is doubtful for above ground tanks and it does not give the leak location. The primary disadvantage of this method is the potential for significant changes in storage tanks and product volume for reasons other than leakage. For example, and not taking into account the effects of floor, shell or roof movement, a product temperature change of 0.01° F. per hour will produce a volume change of 16 gallons per hour in a 55,900 barrel crude oil storage tank.

Inventory reconciliation is another method utilized today and is attractive as a continuous process but is limited by the measurement capacity of the instrumentation. This method also suffers from the same volume compensation problems as the precision testing method. Even if a leak is detected, its location is unknown. Leakage could be the result of a leak in a pump or piping, rather than the storage tank.

The tracer method of leak detection is very sensitive but it is also a very lengthy and costly procedure. Equipment setup and time for the tracer to percolate to a sample point could take days or even weeks. With careful use, the tracer method can detect very small leaks, although leak size and location cannot be determined.

The acoustic leak detection method is best suited for large atmospheric tanks. It relies on detecting acoustic signals that arise from leaks. Leak detection is limited by the level of signal from the leak compared to background noise. Determination of leak location is difficult because of interaction between differing leak and noise sources and the tank boundaries.

Heretofore, the conventional approach to acoustic leak detection utilized a ring of sensors spaced around the tank shell. This arrangement results in sensor spacings of twenty-five feet or more which presents difficulties with signal and noise discrimination. To locate an acoustic source utilizing the large array arrangement, the signal arrival times must be measured from three sensor positions or more. On detecting a signal at one sensor, the large array system must wait for the arrival of the signal at two other sensors. With sensors twenty-five feet apart, the delta-T window for the signal is of the order of five milliseconds and a reflection or signal from another source may be detected instead of the desired signal. A single leak can generate acoustic signals at a rate of 1,000 per second or 1 every millisecond, excluding reflections. Thus, in the large array arrangement one sensor could receive a signal directly from the leak, the second sensor could receive a reflection signal and the third sensor a noise signal. Under these circumstances, the timing of measurements are useless. In addition, the large array arrangement utilizes planar location for floor, roof and sidewall noise sources which are plotted in the same plane as leaks, thereby making interpretation difficult. This problem may be minimized by the use of guard sensors to lock out the array when upper level signals are detected. The disadvantage of guard sensors, however, is that the system cannot detect leak signals during the time it waits for noise signals to dissipate.

The large array acoustic leak detection arrangement utilizes standard acoustic emission systems adapted for leak detection. This results in an array set up and test procedure configured for the existing hardware rather than the specific application of detecting leaks in storage tanks. The present disclosure utilizes equipment developed solely for the purpose to locate leaks in storage tanks. The system of the present disclosure is a compact, digital system using novel sensor arrays designed specifically for use on storage tanks.

It is therefore an object of this invention to provide an acoustic leak detection system utilizing a small array of sensors placed inside or outside of a storage tank.

It is a further an object of this invention to employ a digital signal process to derive the relative arrival time of a signal at each sensor in the array.

It is yet another object of the invention to provide an acoustic leak detection system employing three dimensional source location to determine the location and nature of acoustic sources whereby incoming signals are screened for consistency in terms of velocity, arrival times, frequency and other attributes. This is accomplished by utilizing a small array arrangement of sensors whereby each sensor receives essentially the same signal at any given time. Multiple acoustic sources are thus distinguishable and unlikely to cause confusion as to the source.

SUMMARY OF THE INVENTION

The acoustic leak detection system of the present disclosure determines the location of leaks in storage tanks. One or more small arrays of sensors are places inside or outside of a storage tank. The sensors detect acoustic signals arising from leaks. The signals are digitally processed and screened for consistency in terms of velocity, arrival times, frequency and other attributes.

The system computes the direction and range or incoming signals and produces a vector that points back along the signal path. The combined data from all array positions is analyzed and the spherical coordinates for all permutation of sensor positions and arrival times are computed.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
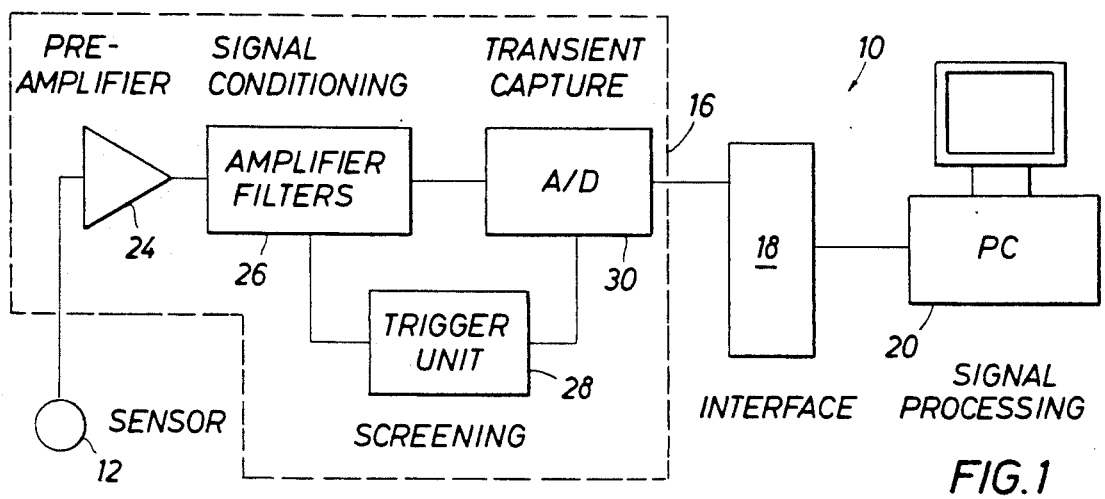
FIG. 1 is a block diagram of the acoustic leak detection system of the present disclosure.

The many advantages of using the small array of the present disclosure are only realized if the signal processing system is capable of precise measurement. The accurate measurement of the relative arrival times of the signal at each sensor in the array is critical. Hardware measurements are based on threshold crossings that cannot achieve the necessary degree of accuracy which is provided by digital signal processing. The acoustic leak detection system of the present disclosure utilizes digital signal processing throughout to derive the relative arrival time of a signal at each sensor in the array. Referring now to FIG. 1, the acoustic leak detection system of the present disclosure is generally identified by the reference numeral 1 and shown in block diagram. Leak signals are detected by a sensor array 12. The array geometry is less important than the sensor spacing, which is small compared to the size of the storage tank. The close grouping of sensors and the sensor array 12 is sensitive to signal direction. The sensor array 12 may be internally or externally mounted and is sensitive to acoustic signals in the range of 5 to 300 kHz. The leak signal frequency spectrum is influenced by the hole size, plate thickness of the storage tank and fluid viscosity. When using externally placed sensors, it is preferred to monitor from three positions around the storage tank to achieve full coverage. With an internal array placement, a single monitoring position is sufficient in most cases.

The leak detection system 10 incorporates eight data acquisition channels 16. One data acquisition channel 16 is connected to each of the sensors of the sensor array 12. The data acquisition units 16 are connected to an interface 18 which transfers the signal data to a computer 20 for processing.

Figure 2:
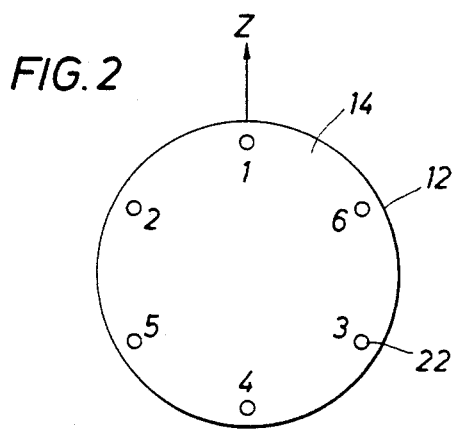
FIG. 2 is a top plan view of the sensor array of the present disclosure.

One channel of the eight channel data acquisition unit 16 is shown in the block diagram of FIG. 1. It is understood however, that eight identical data acquisition channels 16 are incorporated in the leak detection system 10. It is further understood that the leak detection system 10 contemplates the use of two or more sensors, up to a maximum of eight, to detect leak signals arising from a storage tank. In the embodiment of FIG. 2, six sensors 22 are shown mounted to the support plate 14. Alternative, each sensor 22 may be individually mounted on the shell of the tanks in the chosen configuration.

Referring again to FIG. 1, each data acquisition channel 16 comprises a preamplifier 24, amplifier filter 26, trigger unit 28 and a transent capture unit 30. Signals detected by the sensors 22 are digitized by the data acquisition channel 16 and transferred to the computer 20 for processing. The trigger unit 28 screens out general background noise. If a signal other than background noise is detected, the trigger module 28 releases the data which has been the digitally conversed and captured in the transient capture module 30. The released signal is then transmitted to the computer 20 where it is processed. The frequency, arrival time and other data is extracted from the digitized signal. This information feeds the location algorithm which computes the spherical coordination for all permutations of sensor positions and arrival times. The signal to noise ratio is also analyzed and after taking into account an error factor, the set with the best fit is selected. If this set is within prescribed bounds, it is accepted as a "feature". Other sets are tagged as "rejections" and may be recorded for further analysis. The selected features are plotted and the direction and range of incoming signals are computed and produce a vector that points back along the signal path. Signals which do not arise from the storage tank floor are screened out thereby reducing the incidents of false signals and providing a more reliable leak determination. A consequence of this screening and calculation process is that the detection system 10 of the present disclosure accepts less data than conventional acoustic emission systems. However, this comparatively small data set give a much better picture of acoustic sources in a tank, making it much simpler to interpret results and locate the source of the leak detection signal.

Figure 3:
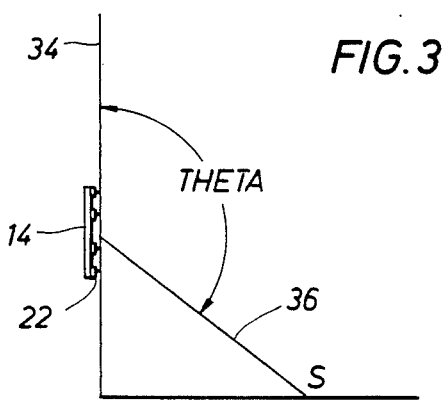
FIG. 3 is a cross sectional, partial side view of the sensor array of the invention mounted on a storage tank.
Figure 4:
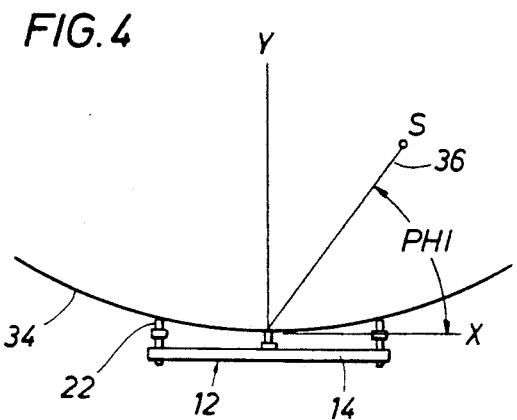
FIG. 4 is a partial top view of the sensor array of the present disclosure mounted on a storage tank.

Referring now to FIGS. 2-4, the sensor array 12 comprises a plurality of sensors 22 mounted on a plate 14. Two to eight sensors 22 may be carried on the plate 14, six sensors 22 being preferred. The sensors 22 are typically mounted about the circumference of the circular plate 14. The sensors 22 are substantially equally spaced about the support 14 and positioned at a height of 3 to 10 feet above the storage tank base 32. One or more sensor arrays 12 may be mounted about the storage tank wall 34 The sensor arrays 12 can locate acoustic sources anywhere in the storage tank from a single location. However, to minimize shadowing by tank internals and attenuation effects, placement of three or more separate sensor arrays 12 around the tank wall 34 is preferred.

Figure 5:
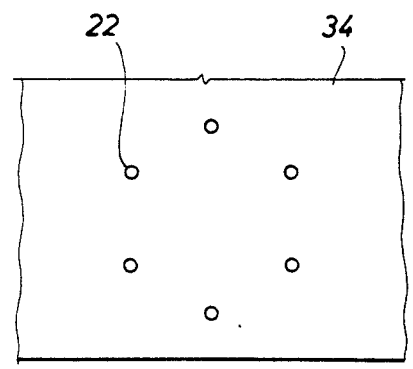
FIG. 5 is a partial side view of an alternate embodiment of the configuration of the sensor array secured to a storage tank wall.

In FIG. 5, an alternate sensor arrangement is shown. The sensor 22 in the embodiment of FIG. 5 are individually secured to the tank wall 34. The preferred configuration is a circular pattern, however, other patterns may be selected if desired.

The leak detection system 10 uses three dimensional source location to determine the source of a leak detection signal. Analysis of the detected signals yields a vectors which points back along the signal path. The angular orientation of the vector 36 may be computed to yield the angles theta and phi as shown in FIGS. 3 and 4.

Use of the leak detection system 10 requires certain operational considerations and tank preparation. The storage tank 11 must be isolated from all pumping operations such that there is no flow in or out of the tank 11. Mechanical equipment connected to the tank 11, such as agitators, pumps, etc., must be shut down during the test. All pumping operations must stop so that the tank is still for a ten hour period prior to testing. Any maintenance or operational work involving welding, grinding, compressors or other sources of acoustic noise with 100 feet of the test tank 11 must be shut down for the period of the leak test. The liquid level in the tank 11 must be at least 15 feet or the tank 11 must be 50% filled, whichever is greater. Insulated tanks require the cut out of insulation windows so that the sensor arrays 12 may be mounted directly to the tank wall. Preferably, a series of magnets spaced about the plate 14 secure the sensor arrays 12 to the wall 34 of the tanks 11. Other means may be employed to secure the sensor arrays 12 to the tank wall 34 such as suction cups or the like. Other tank data such as tank type and dimension, location and type of internal fittings, recent maintenance history, normal operating perimeters, and test conditions are factors which are considered when analyzing the signal data received from the sensors 22. The combined information is used by the analysis program of the invention to compute the spherical coordinates for all permutations of sensor conditions and arrival times as previously discussed.

The leak detection system 10 of the present disclosure locates the source of leaks and other acoustic sources. Floor, shell and roof sources are clearly distinguishable by plotting the vector 36 which points back to the source of the detected signal. The close grouping of sensors 22 of the present invention is sensitive to signal direction. Thereby reducing the incidents of false detections and increasing the reliability of the leak detection test.

While the foregoing is directed to the preferred embodiment of the present invention, other and further embodiments of the invention may be devised without departing from the basic scope thereof, and the scope thereof is determined by the claims which follow.

What is claimed is:

1. An acoustic leak detection system for determining the location of leaks in storage tanks, comprising:
   a) sensor means for detecting a leak signal;
   b) data acquisition means for digitizing and storing leak signals meeting preset criterion; and
   c) analysis means for analyzing the digitized signals and computing the location of the source of the leak signals.

2. The system of claim 1 wherein said sensor means comprises an array of sensors secured to a storage tank wall.

3. The system of claim 1 wherein said data acquisition means comprises preamplifier, amplifier filter, screening, and transient capture modules for digitizing and storing signals meeting a preset criteria and subsequent transfer to said analyzing means.

4. The system of claim 3 wherein said screening module compares the sensor signal to general background noise and screens out all signals which do not meet the preset criteria.

5. The system of claim 1 wherein said analyzing means comprises a computer program which computes the spherical coordinates of sensor signals for all permutations of sensor positions and signal arrival times to form a vector which indicates the signal path.

6. The system of claim 1 wherein multiple sensors forming the sensor array permit spherical location of acoustic sources.

* * * * *